US010246589B2

(12) United States Patent
Bertuletti et al.

(10) Patent No.: US 10,246,589 B2
(45) Date of Patent: Apr. 2, 2019

(54) ANTI-ICING ADDITIVE COMPOSITION FOR BITUMINOUS CONGLOMERATES

(71) Applicant: ITERCHIMICA S.R.L., Suisio (BG) (IT)

(72) Inventors: Elisa Bertuletti, Suisio (IT); Piero Baruzzi, Suisio (IT); Federica Giannattasio, Suisio (IT)

(73) Assignee: ITERCHIMICA S.R.L., Suisio (BG) (IT)

( * ) Notice: Subject to any disclaimer, the term of this patent is extended or adjusted under 35 U.S.C. 154(b) by 0 days.

(21) Appl. No.: 15/761,688

(22) PCT Filed: Jun. 15, 2017

(86) PCT No.: PCT/EP2017/064661
§ 371 (c)(1),
(2) Date: Mar. 20, 2018

(87) PCT Pub. No.: WO2017/220421
PCT Pub. Date: Dec. 28, 2017

(65) Prior Publication Data
US 2018/0346726 A1 Dec. 6, 2018

(30) Foreign Application Priority Data
Jun. 20, 2016 (IT) .................. 102016000063307

(51) Int. Cl.
C08K 3/16 (2006.01)
C09K 3/18 (2006.01)
C08L 83/04 (2006.01)
C08L 95/00 (2006.01)
C08K 3/26 (2006.01)
C08K 5/098 (2006.01)

(52) U.S. Cl.
CPC ............... *C08L 95/00* (2013.01); *C08K 3/16* (2013.01); *C08K 3/26* (2013.01); *C08K 5/098* (2013.01); *C08L 83/04* (2013.01); *C09K 3/18* (2013.01); *C08K 2003/162* (2013.01); *C08K 2003/265* (2013.01); *C08L 2555/52* (2013.01)

(58) Field of Classification Search
CPC ... C09K 3/18; C08K 3/16; C08K 3/26; C08K 5/098; C08K 2003/162; C08K 2003/265; C08L 83/04; C08L 95/00; C08L 2555/52
See application file for complete search history.

(56) References Cited

U.S. PATENT DOCUMENTS

| | | | | |
|---|---|---|---|---|
| 7,632,421 B2 * | 12/2009 | Bytnar | ................... | C09K 3/185 106/13 |
| 8,048,332 B2 * | 11/2011 | Dopico | ................... | C09K 3/185 106/13 |
| 8,409,465 B1 * | 4/2013 | Cheng | ................... | C09K 3/185 106/13 |
| 8,647,709 B2 * | 2/2014 | Alger | ..................... | C09K 3/18 427/136 |
| 9,309,449 B2 * | 4/2016 | Koefod | ................... | C09K 3/18 |
| 2003/0070578 A1 | 4/2003 | Alger | | |

FOREIGN PATENT DOCUMENTS

| | | | | |
|---|---|---|---|---|
| EP | 0332803 A2 | 9/1989 | | |
| EP | 0506984 A1 | 10/1992 | | |
| KR | 10-1001949 B1 * | 12/2010 | ............. | E01C 11/24 |
| WO | 2007/096690 A1 | 8/2007 | | |
| WO | WO-2017032916 A1 * | 3/2017 | ........... | E01H 10/007 |

OTHER PUBLICATIONS

Winterpave; Safety Data Sheet, pp. 1-8, XP055349429, 2014.
Winterpave Ad Anti-Freeze Product for Bituminous Mixes; pp. 1-3, XP055349588, 2016.
International Search Report and Written Opinion for International Application No. PCT/EP2017/064661 (11 Pages) (dated Sep. 28, 2017).

* cited by examiner

*Primary Examiner* — Anthony J Green
(74) *Attorney, Agent, or Firm* — Lucas & Mercanti

(57) ABSTRACT

An anti-icing composition suitable for incorporation in bituminous conglomerates for road paving, comprising an alkali metal chloride, an alkaline-earth metal carbonate, an alkali or alkaline-earth metal formate, a polysiloxane and optionally an alkaline-earth metal chloride, in which the polysiloxane is contained in an amount between 0.5 and 2.0% by weight of the total weight of the composition; it is also described a bituminous conglomerate adapted to provide an anti-icing road paving, comprising aggregates, bitumen, filler and from 2 to 6% by weight of such anti-icing composition of the weight of the aggregates.

19 Claims, 1 Drawing Sheet

ANTI-ICING ADDITIVE COMPOSITION FOR BITUMINOUS CONGLOMERATES

CROSS-REFERENCE TO RELATED APPLICATIONS

This application is a 371 of PCT/EP2017/064661, filed Jun. 15, 2017, which claims the benefit of Italian Patent Application No. 102016000063307, filed Jun. 20, 2016.

FIELD OF APPLICATION

The present invention refers to the technical sector of the production of bituminous conglomerates for road paving.

In particular, the invention refers to an additive composition for bituminous conglomerates, which allows to prevent, reduce or delay the formation of ice on the surface of the road paving.

PRIOR ART

It is well known that during the winter season the tire adhesion to the paved road surface can be greatly reduced due to the formation of ice on this surface, with subsequent risk of slipping, loss of control and reduction of braking capacity of the vehicles.

It is also known that the measure conventionally adopted to reduce the aforementioned risks lies in spreading beforehand onto the road surface salts, generally sodium chloride, which lower the freezing point of water so as to prevent ice formation and to avoid the adhesion of snow to the road paving.

It is clear, however, that the salt spreading must be carried out promptly before the beginning of a snowfall or a sharp drop in temperature under high atmospheric humidity conditions, and this does not always happen, or anyway not always over the entire length of the road.

In some cases, electric resistances have been inserted in road pavements, but this entails considerable production and management costs and reduces the resistance of the road surface.

It has also been proposed to pave the roads in areas with high risk of ice formation with special bituminous conglomerates incorporating additives adapted to prevent or reduce ice formation.

An example in this sense is provided in patent application EP 0 332 803, which refers to an anti-icing road cover obtained by incorporating into a bituminous conglomerate 3 to 5% of a granular mixture comprising an alkali chloride, a thermoplastic material and an additive such as talc, cement or polyurethane powder.

Another example is given in EP 0 506 984, which describes an anti-icing composition to be incorporated into a bituminous conglomerate or to be directly applied on a road surface, comprising 5-95% of an alkali metal and/or alkaline earth metal chloride and 5-15% of an alkaline metal alkene siliconate.

A further example is provided by patent application WO 2007/096690, which describes an anti-icing composition to be incorporated into a bituminous conglomerate, comprising an alkaline and/or alkaline earth salt with a molecular weight lower than 200 Da, for example a sodium or calcium formate or acetate, and at least one surfactant, which is preferably a polyamine alkylamide, and optionally also a siloxane.

The Applicant herself has been producing and marketing for several years an anti-icing composition, called Winterpav, suitable for incorporation into bituminous conglomerates, comprising sodium chloride, calcium chloride, sodium formate and calcium carbonate. Such composition has proven to be very effective in preventing or at least significantly reducing the formation of ice on the surface of the road paving that incorporates it and its anti-ice effect is maintained for many months.

Furthermore, it has been verified that the presence of such composition in a conglomerate for road paving in quantities up to 5% by weight of the conglomerate does not lead to any substantial modification of the physical-mechanical properties of the road paving obtained with it.

Such anti-icing composition, however, has some drawbacks in relation to its handling and storage. Indeed, this is a composition of solid compounds in the form of powder, with a variable particle size, where very fine particles are present too, which can lead to potential risks of inhalation by the operators who use it. Also, some of the components, particularly calcium chloride and sodium chloride, are highly hygroscopic and this can lead to packing phenomena during storage.

In the light of the above-discussed prior art and above all of the drawbacks highlighted with reference to the product Winterpav, the problem underlying the present invention was that of providing an anti-icing composition suitable to be incorporated into bituminous conglomerates for road paving, having the same effectiveness of the aforementioned product and being at the same time free from the drawbacks outlined above.

SUMMARY OF THE INVENTION

Such a problem has been solved by providing an anti-icing composition suitable to be incorporated into bituminous conglomerates for road paving, comprising an alkali metal chloride, an alkaline-earth metal carbonate, an alkali or alkaline-earth metal formate, a polysiloxane and optionally an alkaline-earth metal chloride, wherein the polysiloxane is contained in an amount between 0.5 and 2.0% by weight on the total weight of the composition.

Preferably the composition comprises an alkali metal chloride and an alkaline-earth metal chloride and conveniently the alkali metal chloride is sodium chloride and the alkaline-earth metal chloride is calcium chloride.

Preferably, the alkaline-earth metal carbonate is calcium carbonate.

Preferably the composition comprises an alkali metal formate, conveniently sodium formate.

The polysiloxane preferably consists of a polydimethylsiloxane or dimethicone, which preferably has a viscosity of between 300 and 400 mm$^2$/s, conveniently between 325 e 375 mm$^2$/s at 25° C.

A particularly preferred anti-icing composition is formed by the following components, expressed in percentages by weight on the total weight of the composition:

| | |
|---|---|
| sodium chloride | 60-84 |
| sodium formate | 5-15 |
| calcium chloride | 5-15 |
| calcium carbonate | 2-8 |
| polysiloxane | 0.5-2.0 |

All the percentages indicated in the text of the present application are to be understood as percentages weight/weight, unless otherwise specified.

With the anti-icing composition according to the invention, a bituminous formulation intended to be used as a component of a bituminous conglomerate can be prepared.

The bituminous formulation prepared from the anti-icing composition according to the present invention generally comprises from 20 to 70% of said anti-icing composition and from 30 to 80% bitumen.

Preferably, this bituminous formulation comprises from 30 to 60% of said anti-icing composition and from 40 to 70% of bitumen.

The bituminous formulation can in turn be used to prepare a bituminous conglomerate adapted to make anti-icing road paving. Such bituminous conglomerate includes aggregates, including, for example, inert, inorganic materials such as crushed stone materials, granular and crushed slag, artificial aggregates produced, for example, by high temperature melting of certain minerals or rocks (e.g. bauxite or certain clays), fillers and, where appropriate, polymeric materials in granular form, in addition to the above-mentioned bituminous formulation, which is generally contained in amounts from 3 to 10% by weight on the weight of the aggregates.

Alternatively, the anti-icing composition according to the invention can be directly added to a bituminous conglomerate comprising aggregates, fillers and bitumen and mixed with it in such quantity that the final bituminous conglomerate comprises from 2% to 6%, preferably from 3% to 5%, by weight of said composition on the weight of the aggregates.

The present invention thus relates also to a bituminous conglomerate adapted to provide an anti-icing road paving, comprising aggregates, fillers and bitumen and from 2 to 6%, preferably from 3 to 5%, by weight of the weight of the aggregates, of the aforementioned anti-icing composition, as well as to a bituminous conglomerate adapted to provide an anti-icing road paving comprising aggregates, fillers and from 3 to 10%, by weight of weight of the aggregates, of the aforementioned anti-icing bituminous formulation.

In one of its further aspects, the present invention refers to a method for producing a bituminous conglomerate adapted to provide an anti-icing road paving, comprising the step of adding, under stirring and at a temperature varying from 130° C. to 200° C., bitumen and an anti-icing composition as described above to a mixture of aggregates and fillers.

In another aspect, the present invention refers to a method for producing a bituminous conglomerate adapted to provide an anti-icing road paving, comprising the step of adding, under stirring and at a temperature varying from 130° C. to 200° C., to a mixture of aggregates and fillers, an anti-icing bituminous formulation as described above.

Finally, the present invention relates to a method for producing an anti-icing composition as described above, which comprises the steps of mixing the alkali metal chloride, the alkaline-earth metal carbonate, the alkali or alkaline-earth metal formate and optionally the alkaline-earth metal chloride to obtain a mixture in the form of a homogeneous powder and adding the polysiloxane dispersed in a finely divided form into said mixture in the form of a homogeneous powder.

This way, the polysiloxane uniformly coats the powder granules, including the smallest ones, and prevents them from spreading in the air during handling and transport operations of the anti-icing composition according to the invention, thus preventing any risk of inhalation by the people involved in such operations.

Preferably, the polysiloxane addition step is performed by spraying the polysiloxane by means of a spray device onto the mixture in the form of homogeneous powder kept under stirring in a mixer, preferably a screw mixer.

When added to bituminous conglomerates for road paving, the anti-icing composition according to the present invention allows to obtain a road paving that can prevent or at least significantly reduce the formation of ice on the surface, without any substantial change of the physical-mechanical properties with respect to a road paving obtained from an equal bituminous conglomerate without the addition of anti-ice composition.

The anti-icing effect conferred on a road pavement by the anti-icing composition incorporated in the bituminous conglomerate remains substantially unchanged for at least two months, typically for about 12 months, then it gradually decreases, being, however, still useful to provide a good protection against ice formation for another 24 months.

Moreover, the composition according to the present invention is easy and safe to handle, because it is free from fine powders, which might be inhaled by the operators who use it.

The composition according to the present invention can moreover be stored for long periods of time, even for many months, without risks of packing, and maintains its flowability properties unaltered over time, which properties are important when adding this composition to the bituminous conglomerate, in order to ensure its accurate and reproducible dosing.

The characteristics and the advantages of the present invention will be further highlighted by some embodiments thereof, which are hereinafter exposed by way of illustration and not of limitation, with reference also the annexed figures.

DETAILED DESCRIPTION

Figure 1:
FIG. 1 is a photograph of a slab made in laboratory with the bituminous conglomerate A of Example 6, containing the anti-icing composition according to Example 1.

Hereinafter are some examples of anti-icing compositions according to the present invention, which have been prepared and tested with favorable results in relation to their effect of ice formation prevention.

Example 1

| | |
|---|---|
| Sodium chloride | 70% |
| Calcium chloride | 13% |
| Sodium formate | 11% |
| Calcium carbonate | 5% |
| Dimethicone with a viscosity of 350 mm$^2$/s at 25° C. | 1% |

Example 2

| | |
|---|---|
| Sodium chloride | 80% |
| Sodium formate | 12% |
| Calcium carbonate | 6% |
| Dimethicone with a viscosity of 300 mm$^2$/s at 25° C. | 2% |

Example 3

| | |
|---|---|
| Sodium chloride | 60% |
| Calcium chloride | 15% |
| Sodium formate | 15% |
| Calcium carbonate | 8% |
| Dimethicone with a viscosity of 400 mm$^2$/s at 25° C. | 2% |

Example 4

| | |
|---|---|
| Sodium chloride | 84% |
| Calcium chloride | 5% |
| Sodium formate | 5% |
| Calcium carbonate | 5.5% |
| Dimethicone with a viscosity of 350 mm$^2$/s at 25° C. | 0.5% |

The compositions of Examples 1 to 4 were prepared by mixing the various salts listed, except calcium carbonate, in the form of coarse powders inside a screw mixer and uniformly spraying dimethicone over them by a spray gun, while they are kept under stirring. After the addition of dimethicone, the powdered calcium carbonate is added under stirring and stirring is continued until a homogeneous mixture is obtained.

Example 5 (Comparative)

| | |
|---|---|
| Sodium chloride | 71% |
| Calcium chloride | 13% |
| Sodium formate | 11% |
| Calcium carbonate | 5% |

This composition is prepared by dosing the ingredients in the form of coarse powder in a screw mixer under stirring and stirring is continued until a homogeneous mixture is obtained.

Example 6

Using the composition according to Example 1 three slabs of bituminous conglomerate containing such composition in the proportions indicated in the following Table 1 and having a diameter of 100 mm and a thickness of about 25 mm were prepared in the laboratory. Three slabs of bituminous conglomerate with the same composition but not containing the above composition were also prepared.

TABLE 1

| Materials | Bituminous conglomerate A, containing the composition of example 1 Parts by weight | Bituminous conglomerater B, without the composition of example 1 Parts by weight |
|---|---|---|
| Inerts 6/12 | 20 | 20 |
| Inerts 3/8 | 50 | 50 |
| Sand 0-4 | 25 | 25 |
| Filler (CaCO$_3$) | 5 | 5 |
| Bitumen 50/70 | 5.5 | 5.5 |
| Composition of example 1 | 4 | 0 |
| Total | 109.5 | 105.5 |

The bituminous conglomerate is prepared in the laboratory by bringing the aggregates (inerts, sand) and the filler to a temperature of 180° C. inside a 5 liter planetary mixer and adding to them, under stirring, the bitumen heated at 150° C. and, in the case of bituminous conglomerate A, also the composition of Example 1, both at room temperature, after which stirring is continued for 5 minutes.

The bituminous conglomerate is then discharges from the planetary mixer, dosed in quantities of about 300 g inside a porcelain container and inserted into a rotary press (30 cycles) kept at a temperature of 150° C., applying a pressure of about 600 kPa to form respective slabs with a diameter of 100 mm, with a thickness of about 30 mm and a weight of about 100 g.

The three slabs of conglomerate A and the three slabs of conglomerate B are then placed on respective non-metallic discs and introduced into a refrigerator at a temperature of −5° C. for at least 2 hours, so as to obtain the thermal normalization of the samples. Subsequently the slabs are sprayed onto their surface with water at a temperature of 4° C. (which simulates a situation of rain mixed with snow), 6 sprays (about 8-9 ml) and kept in the refrigerator at −5° C. for another 12 hours, afterwards a visual examination of the slabs is carried out to determine the possible presence of frost or ice on their surface.

In case neither frost nor ice is formed, the slab is brought back to room temperature, the excess water is removed, the disc is cleaned, the slab is thrice immersed in water inside a becker and the procedure of normalization in refrigerator at −5° C., spraying with water at 4° C. and storage in refrigerator at −5° C. for 12 hours is repeated, eventually verifying the possible formation of ice or frost.

Figure 2:
FIG. 2 is a photograph of a slab made in laboratory with the comparison bituminous conglomerate B of Example 6, not containing the anti-icing composition according to the present invention.

FIGS. 1 and 2 show respective photos of a slab of the bituminous conglomerate A and of a slab of the bituminous conglomerate B. In particular, FIG. 2 shows a slab of bituminous conglomerate B at the end of only one cycle of normalization, water spraying and storage at −5° C. for 12 hours, while FIG. 1 shows a slab of conglomerate A at the end of 5 cycles as above with the interposition of immersions in water as described above between each cycle. It is quite obvious that there is no ice in slab A while a layer of ice is clearly visible on the surface of slab B, formed at the end of the first step of the procedure described above.

This shows that the presence of the anti-icing composition according to example 1 of the present invention inside the bituminous conglomerate A has completely prevented the formation of ice, wherein conglomerate B, in every single way equal to the conglomerate A except for the absence of the composition according to Example 1, did not show any anti-ice effect.

Example 7

The absorption of moisture from the atmosphere by the composition according to Example 1 was verified and compared with the composition according to example 5, which is free of dimethicone.

The verification was conducted by depositing a carefully measured quantity of each one of the above-mentioned compositions on four respective Petri glass plates and leaving these plates exposed to the atmospheric air at a temperature of about 20° C. for the periods indicated in the following Table 2. At the end of each period the quantity of humidity absorbed was determined (humidity content %) by means of a thermobalance at 120° C. for 20 minutes.

TABLE 2

| Time | Example 1 (humidity content %) | Example 5 (humidity content %) |
| --- | --- | --- |
| 1 day | 1.02 | 2.3 |
| 30 days | 1.7 | 4.6 |
| 60 days | 2.0 | 9.5 |
| 90 days | 1.8 | 9.3 |

From the results presented in Table 2 it clearly emerges that the presence of a polysiloxane in the composition according to the present invention gives it a high degree of protection against atmospheric humidity, which results in the above-noted advantage of avoiding any packing phenomenon and any reduction of its flowability properties.

Example 8

It has been verified whether the addition of the composition according to the present invention to a bituminous conglomerate would cause some alteration of the physical-mechanical properties of a wear layer made with such a conglomerate.

For this purpose, specimens of bituminous conglomerate were made according to a SMA curve as shown in Table 3 below.

TABLE 3

| Materials | Bituminous conglomerate SMA1, containing the composition of Example 1 Parts by weight | Bituminous conglomerate SMA2, without the composition of Example 1 Parts by weight |
| --- | --- | --- |
| Inerts 6/12 | 10 | 10 |
| Inerts 3/6 | 60 | 60 |
| Sand 0-4 | 20 | 20 |
| Filler (CaCO$_3$) | 10 | 10 |
| Plastomers and microfibers | 0.6 | 0.6 |
| Bitumen 50/70 | 6.5 | 6.5 |
| Composition of example 1 | 4 | 0 |
| Total | 111.1 | 107.1 |

The specimens were prepared by depositing about 1.2 kg of bituminous conglomerate in a cylindrical container kept at 150° C. for at least 2 hours and pressing it in a rotary press to form a respective cylindrical specimen, with a diameter of 100 mm and a height of about 65 mm. For each specimen, the physical-mechanical determinations set out in Table 4 were performed:

TABLE 4

| | Conglomerate SMA1 | Conglomerate SMA2 | Technical specifications |
| --- | --- | --- | --- |
| Residual voids (%) at 10 cycles | 12.5 | 10.5 | 9-13 |
| Residual voids (%) at 120 cycles | 4.6 | 3.8 | 2-5 |
| Residual voids (%) at 200 cycles | 3.5 | 1.1 | ≥1 |
| GMM[1] at 200 cycles (Maximal Specific Gravity) (kg/m$^3$) | 2449 | 2384 | — |
| GMB[2] at 200 cycles (Bulk Specific Gravity) (kg/m$^3$) | 2365 | 2358 | — |
| ITS[3] at 200 cycles 25° C. (N/mm$^2$) | 1.30 | 1.33 | 1.0-1.80 |
| CTI[4] at 200 cycles 25° C. (N/mm$^2$) | 112 | 123 | ≥85 |

[1]GMM is the theoretical maximum specific gravity (at zero air voids) of the bituminous conglomerate, measured according to AASHTO T 209 standard.
2GMB is the density of the conglomerate with the voids (bulk specific gravity), measured according to AASHTO T 166 standard.
[3]ITS indicates the tensile strength evaluated according to UNI EN 12697-23 standard at a temperature of 25° C.
[4]CTI indicates the indirect tensile strength coefficient evaluated according to UNI EN 12697-23 standard at a temperature of 25° C.

The percentage of residual voids at 10 cycles simulates the compacting of the bituminous conglomerate after the paver has been applied; the 120-cycle residual voids percentage simulates the compacting of the bituminous conglomerate after rolling (i.e. after the paved road has been opened to traffic) and the percentage of voids at 200 cycles simulates the compacting of the bituminous conglomerate towards the end of the service life of the asphalt pavement (10-15 years).

As it can be noted from the data set out in Table 3, the wear layer made with the SMA1 conglomerate, containing the anti-icing composition according to Example 1, showed GMM and GMB values fully comparable to those of the SMA2 conglomerate, free of such anti-icing composition, and excellent values of tensile strength and indirect tensile strength coefficient.

This means that the addition of the anti-icing composition according to the present invention to a bituminous conglomerate for road paving provides excellent protection against ice formation on the surface without significantly altering the physical-mechanical properties of the road pavement obtained with it.

Example 9

A comparison test was performed between a composition according to the present invention and the composition according to Example 5, free of dimethicone and corresponding to the known product Winterpay.

For this purpose, specimens of bituminous conglomerate were made according to a SMA curve as shown in Table 5 below.

TABLE 5

| Materials | Bituminous conglomerate SMA1, containing the composition of Example 1 Parts by weight | Bituminous conglomerate SMA5, containing the composition of Example 5 Parts by weight |
| --- | --- | --- |
| Inerts 6/12 | 10 | 10 |
| Inerts 3/6 | 60 | 60 |
| Sand 0-4 | 20 | 20 |
| Filler (CaCO$_3$) | 10 | 10 |
| Plastomers and microfibers | 0.6 | 0.6 |
| Bitumen 50/70 | 6.5 | 6.5 |
| Composition of example 1 | 4 | 0 |
| Composition of example 5 | 0 | 4 |
| Total | 111.1 | 111.1 |

The specimens were prepared by depositing about 1.2 kg of bituminous conglomerate in a cylindric container kept at 150° C. for at least 2 hours and by pressing it in a rotary press to form a respective specimen of cylindrical form, with a diameter of 100 mm and a height of about 65 mm. For each sample, the physical-mechanical determinations set out in Table 6 were performed:

TABLE 6

| | Conglomerate SMA1 | Conglomerate SMA5 | Technical specifications |
| --- | --- | --- | --- |
| Residual voids (%) at 10 cycles | 12.3 | 12.4 | 9-13 |
| Residual voids (%) at 120 cycles | 4.5 | 2.0 | 2-5 |
| Residual voids (%) at 200 cycles | 3.1 | 1.0 | 1 |
| GMM[1] at 200 cycles (Maximal Specific Gravity) (kg/m$^3$) | 2399 | 2420 | — |
| GMB[2] at 200 cycles (Bulk Specific Gravity) (kg/m$^3$) | 2301 | 2424 | — |
| ITS[3] at 200 cycles 25° C. (N/mm$^2$) | 1.28 | 1.60 | 1.0-1.80 |
| CTI[4] at 200 cycles 25° C. (N/mm$^2$) | 108 | 134 | ≥85 |

[1]GMM is the theoretical maximum specific gravity (at zero air voids) of the bituminous conglomerate, measured according to AASHTO T 209 standard.
[2]GMB is the density of the conglomerate with the voids (bulk specific gravity), measured according to AASHTO T 166 standard.
[3]ITS indicates the tensile strength evaluated according to UNI EN 12697-23 standard at a temperature of 25° C.
[4]CTI indicates the indirect tensile strength coefficient evaluated according to UNI EN 12697-23 standard at a temperature of 25 ° C.

As it can be noted from the data set out in Table 6, the wear layer made with the SMA1 conglomerate, containing the anti-icing composition according to Example 1, showed GMM and GMB values fully comparable to those of the SMA5 conglomerate containing the anti-icing composition according to Example 5, and excellent values of tensile strength and indirect tensile strength coefficient.

This means that the presence of polysiloxane within the anti-icing composition according to the present invention has allowed to solve the above mentioned technical problem of overcoming the disadvantages associated with the product Winterpav (risk of inhalation of the very fine powder particles contained therein and packing phenomena due to hygroscopicity), ensuring the same anti-icing effect and without jeopardizing in any way the physical-mechanical properties of the road pavement made with a bituminous conglomerate containing such composition.

Example 10

The behavior during storage of a batch of a product with a composition according to Example 1 was verified by keeping in a store at room temperature 1500 kg of this product closed in two polyethylene "big bags" (FIBCs) placed one over the other and the two of them over four bags made of low melting LDPE, each of which in turn contained 25 kg of the same composition. Two months later, the two big bags were inspected to check the status of the product and no packing phenomenon was detected and it was possible to empty the contents of these bags by gravity in only about 30 seconds, without any appreciable generation of fine dust. No packing phenomenon was found in the four low melting bags either.

The invention claimed is:

1. An ani-icing composition suitable for incorporation in bituminous conglomerates for road paving, comprising an alkali metal chloride, an alkaline-earth metal carbonate, an alkali or alkaline-earth metal formate, a polysiloxane and optionally an alkaline-earth metal chloride, in which the polysiloxane is contained in an amount between 0.5 and 2.0% by weight of the total weight of the composition.

2. The anti-icing composition according to claim 1, comprising an alkali metal chloride and an alkaline-earth metal chloride, wherein said alkali metal chloride is sodium chloride and said alkaline earth metal chloride is calcium chloride.

3. The anti-icing composition according to claim 2, wherein said alkaline earth metal carbonate is calcium carbonate.

4. The anti-icing composition according to claim 3, wherein said formate is an alkali metal formate.

5. The anti-icing composition according to claim 4, consisting of the following components, indicated in percentages by weight of the total weight of the composition:

| | |
| --- | --- |
| sodium chloride | 60-84 |
| sodium formate | 5-15 |
| calcium chloride | 5-15 |
| calcium carbonate | 2-8 |
| polysiloxane | 0.5-2.0. |

6. The anti-icing composition according to claim 1, wherein said polysiloxane is a polydimethylsiloxane (dimethicone).

7. The anti-icing composition according to claim 6, wherein said polydimethylsiloxane has a viscosity of between 300 and 400 mm$^2$/s.

8. The anti-icing composition according to claim 4, wherein metal formate is sodium formate.

9. The anti-icing composition according to claim 7, wherein said polydimethylsiloxane has a viscosity of between 325 and 375 mm$^2$/s.

10. An anti-icing bituminous formulation comprising from 20 to 70% by weight of the anti-icing composition according to claim 1 and 30 to 80% by weight of bitumen.

11. The bituminous formulation according to claim 10, comprising from 30 to 60% by weight of said anti-icing composition and from 40 to 70% by weight of bitumen.

12. A bituminous conglomerate adapted to provide an anti-icing road paving, comprising aggregates, bitumen, filler and from 2 to 6% by weight of the weight of said aggregates, of said anti-icing composition according to claim 1.

13. A bituminous conglomerate adapted to provide an anti-icing road paving, comprising aggregates, bitumen, filler and from 3 to 5%, by weight of the weight of said aggregates, of said anti-icing composition according to claim 1.

14. A bituminous conglomerate adapted to provide an anti-icing road paving, comprising aggregates, filler and from 3 to 10%, by weight of the weight of said aggregates, of said anti-icing bituminous formulation according to claim 10.

15. A method for producing a bituminous conglomerate, comprising a step of adding, under stirring and at a temperature varying from 130° C. to 200° C., to a mixture of aggregates and filler, bitumen and an anti-icing composition according to claim 1.

16. A method for producing a bituminous conglomerate, comprising the step of adding, under stirring and at a temperature varying from 130° C. to 200° C., to a mixture of aggregates and filler, an anti-icing bituminous formulation according to claim 10.

17. A method for producing an anti-icing composition according to claim 1, which comprises the steps of mixing said alkali metal chloride, said alkali-earth metal carbonate, said alkali or alkaline-earth metal formate, and optionally said alkaline-earth metal chloride to obtain a mixture in the form of a homogeneous powder, and adding said polysiloxane dispersed in a finely divided form to said mixture in the form of a homogenous powder.

18. The method according to claim 17, wherein said step of adding the polysiloxane is performed by spraying the polysiloxane by means of a spray device onto said mixture in the form of a homogeneous powder which is kept under stirring in a mixer.

19. The method according to claim 18, wherein said mixer is a screw mixer.

* * * * *